(12) United States Patent
Lynch et al.

(10) Patent No.: US 11,685,506 B2
(45) Date of Patent: Jun. 27, 2023

(54) AIRCRAFT FLOOR ASSEMBLIES WITH DISCONTINUOUS COUPLING BETWEEN LAYERS

(71) Applicant: Gulfstream Aerospace Corporation, Savannah, GA (US)

(72) Inventors: Kristopher Lynch, Savannah, GA (US); Mike Lucas, Savannah, GA (US); Charles Roberts, II, Savannah, GA (US)

(73) Assignee: Gulfstream Aerospace Corporation

( * ) Notice: Subject to any disclaimer, the term of this patent is extended or adjusted under 35 U.S.C. 154(b) by 315 days.

(21) Appl. No.: 15/929,764

(22) Filed: May 20, 2020

(65) Prior Publication Data

US 2020/0369362 A1 Nov. 26, 2020

Related U.S. Application Data

(60) Provisional application No. 62/850,356, filed on May 20, 2019.

(51) Int. Cl.
| | |
|---|---|
| *B64C 1/18* | (2006.01) |
| *B64C 1/40* | (2006.01) |
| *B32B 7/09* | (2019.01) |
| *B32B 7/14* | (2006.01) |
| *B32B 5/06* | (2006.01) |
| *B32B 3/12* | (2006.01) |

(52) U.S. Cl.
CPC .................. *B64C 1/18* (2013.01); *B32B 3/12* (2013.01); *B32B 5/06* (2013.01); *B32B 7/09* (2019.01); *B32B 7/14* (2013.01); *B64C 1/403* (2013.01); *B32B 2307/10* (2013.01); *B32B 2307/102* (2013.01); *B32B 2471/02* (2013.01); *B32B 2605/003* (2013.01); *B32B 2605/18* (2013.01)

(58) Field of Classification Search
CPC .. B64C 1/18; B64C 1/403; B32B 7/09; B32B 7/14; B32B 3/12; B32B 5/06; B32B 5/073; B32B 2307/10; B32B 2307/102; B32B 2471/02; B32B 2605/003; B32B 2605/18; B60N 3/04; B60N 3/048; E04F 15/20; E04F 15/203; E04F 15/206
See application file for complete search history.

(56) References Cited

U.S. PATENT DOCUMENTS 5,415,917 A * 5/1995 Tesch ...................... B32B 5/022
428/903.3

* cited by examiner

*Primary Examiner* — Catherine A. Simone
(74) *Attorney, Agent, or Firm* — LKGlobal | Lorenz & Kopf, LLP

(57) ABSTRACT

A finished floor assembly covers a floor area of an aircraft and includes a subfloor, a padding assembly, and a finish flooring layer. Noise radiates from the subfloor due to vibrations transmitted by an aircraft structure. The padding assembly attenuates the noise and includes a first pad layer, a second pad layer, and a plurality of discontinuous couplings. The first pad layer abuts the subfloor. The second pad layer is adjacent to the first pad layer. The plurality of discontinuous couplings are laterally separated from each other along the floor area by void portions. The discontinuous couplings secure the first pad layer to the second pad layer and the first pad layer and the second pad layer are in contact at the void portions. The finish flooring layer disposed overtop the padding assembly.

10 Claims, 2 Drawing Sheets

AIRCRAFT FLOOR ASSEMBLIES WITH DISCONTINUOUS COUPLING BETWEEN LAYERS

CROSS-REFERENCE TO RELATED APPLICATION

This application claims the benefit of U.S. Provisional Application No. 62/850,356, filed May 20, 2019, which is incorporated herein by reference in its entirety.

TECHNICAL FIELD

The present invention generally relates to aircraft finished floor assemblies, and more particularly relates to multi layered carpet pad assemblies with discrete couplings between layers.

BACKGROUND

Carpet flooring is typically installed overtop a carpet pad in some aircraft cabin installations. The carpet pad provides walking comfort, thermal protection, and works with the carpet to help block underfloor noise and noise that is radiating off the vibrating structural floor. Although existing carpet flooring assemblies are suitable, it is desirable to improve the comfort, thermal protection, and noise attenuation features of such systems.

Accordingly, it is desirable to provide aircraft floor assemblies. Furthermore, other desirable features and parameters of the present invention will become apparent from the subsequent detailed description of the invention and the appended claims, taken in conjunction with the accompanying drawings and this background of the invention.

BRIEF SUMMARY

Various non-limiting embodiments of finished flooring assemblies and carpet pad assemblies are described herein.

In a first non-limiting embodiment, a finished floor assembly covers a floor area of an aircraft and includes a subfloor, a padding assembly, and a finish flooring layer. Noise radiates from the subfloor due to vibrations transmitted by an aircraft structure. The padding assembly attenuates the noise and includes a first pad layer, a second pad layer, and a plurality of discontinuous couplings. The first pad layer abuts the subfloor. The second pad layer is adjacent to the first pad layer. The plurality of discontinuous couplings are laterally separated from each other along the floor area by void portions. The discontinuous couplings secure the first pad layer to the second pad layer and the first pad layer and the second pad layer are in contact at the void portions. The finish flooring layer disposed overtop the padding assembly.

In a second non-limiting embodiment, a carpet pad assembly for covering and attenuating noise at a floor area of an aircraft above a subfloor and below a finish flooring layer includes a first pad layer, a second pad layer, a third pad layer, and a plurality of discontinuous couplings. The first pad layer abuts the subfloor. The second pad layer is adjacent to the first pad layer. The third pad layer is adjacent to the second pad layer. The discontinuous couplings are laterally separated from each other along the floor area by void portions and secure the first pad layer to the second pad layer. The first pad layer and the second pad layer are in contact at the void portions.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Embodiments described herein generally include carpet pads that are broken up into multiple discrete parallel layers parallel to the floor and bonded together at infrequent discrete locations. Such embodiments have a carpet pad/carpet system sound transmission loss that is higher than that of a conventional single pad system. In some embodiments, the discrete parallel layers are connected around the perimeter of the carpet pad assembly.

Figure 1:
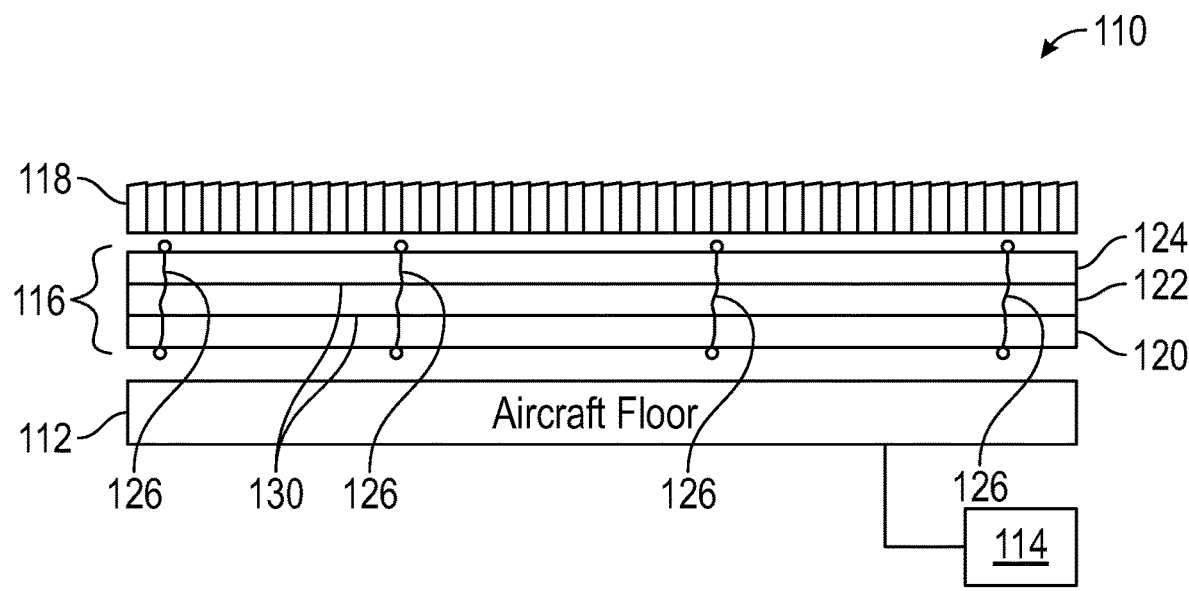
FIG. 1 is a simplified side view illustrating a non-limiting embodiment of an aircraft floor assembly in accordance with the teachings of the present disclosure.

FIG. 1 is a simplified side view of a finished floor assembly 110 for an aircraft. Finished floor assembly 110 includes a subfloor 112 coupled to an aircraft structure 114, a padding assembly 116, and a finish flooring layer 118.

Subfloor 112 may be any suitable conventional subfloor for an aircraft. In the example provided, subfloor 112 is formed from a honeycomb structure designed to support occupants and cargo while remaining light weight. Subfloor 112 receives vibrations through aircraft structure 114 and through noise generated below subfloor 112. For example, air flow on the aircraft skin during flight causes vibrations in an aircraft skin that is transmitted to subfloor 112. Additionally, noise generating components beneath subfloor 112 transmit vibrations to subfloor 112. These vibrations transmitted to subfloor 112 radiate as audible noise to occupants of the aircraft.

Finish flooring layer 118 may be any suitable conventional topmost floor layer. In the example provided, finish flooring layer 118 is carpet installed overtop padding assembly 116 using conventional carpet installation techniques.

Padding assembly 116 has improved noise attenuation to reduce audible noise for the occupants of the aircraft when compared with conventional carpet padding. Padding assembly 116 includes a first pad layer 120, a second pad layer 122, a third pad layer 124, and a plurality of discontinuous couplings 126.

First pad layer 120, second pad layer 122, and third pad layer 124 are discrete pad layers each spanning substantially the entire floor area of padding assembly 116. Pad layers 120, 122, and 124 may be any suitable conventional pad material. In the example provided, pad layers 120, 122, and 124 are carpet pads. In some embodiments, pad layers 120, 122, and 124 are not all the same material. For example, first pad layer 120 may be a high-density carpet pad and second pad layer 122 may be a medium-density carpet pad.

The thickness of each pad layer may be the same as or may be different from the thickness of the other pad layers. In the example provided, pad layers 120, 122, and 124 have the same thickness. In some embodiments, the thickness of the layers varies.

First pad layer 120 is disposed directly overtop subfloor 112. Second pad layer 114 is disposed overtop first pad layer 120 and is in direct contact with first pad layer 120 in all locations where there is not a coupling. Third pad layer 124 is disposed overtop second pad layer 122 and is in direct contact with second pad layer 122 in all locations where there is not a coupling.

Plurality of discontinuous couplings 126 secure pad layers 120, 122, 124 to each other at discrete locations. Each of the discontinuous couplings 126 is laterally separated from other couplings by void portions 130 defined between the discontinuous couplings, as is most easily seen in FIG. 3. As used herein, the term "void portion" means that there is no coupling material located within the portions described as void portions. Instead, the pad layers 120, 122, 124 are directly in contact with each other at the void portions where there is no coupling.

In FIG. 1, discontinuous couplings 126 are illustrated securing first pad layer 120 to second pad layer 122 and securing second pad layer 122 to third pad layer 124. In some embodiments, discontinuous couplings 126 secure only first pad layer 120 to second pad layer 122. In other embodiments, discontinuous couplings 126 secure only second pad layer 122 to third pad layer 124.

Discontinuous couplings 126 may be any suitable connection between layers of material. For example, discontinuous couplings 126 may be stitching, adhesive, needling felt, garment tags, or similar attachment types. The couplings are discontinuous because they are not continuously connected to each other.

Figure 2:
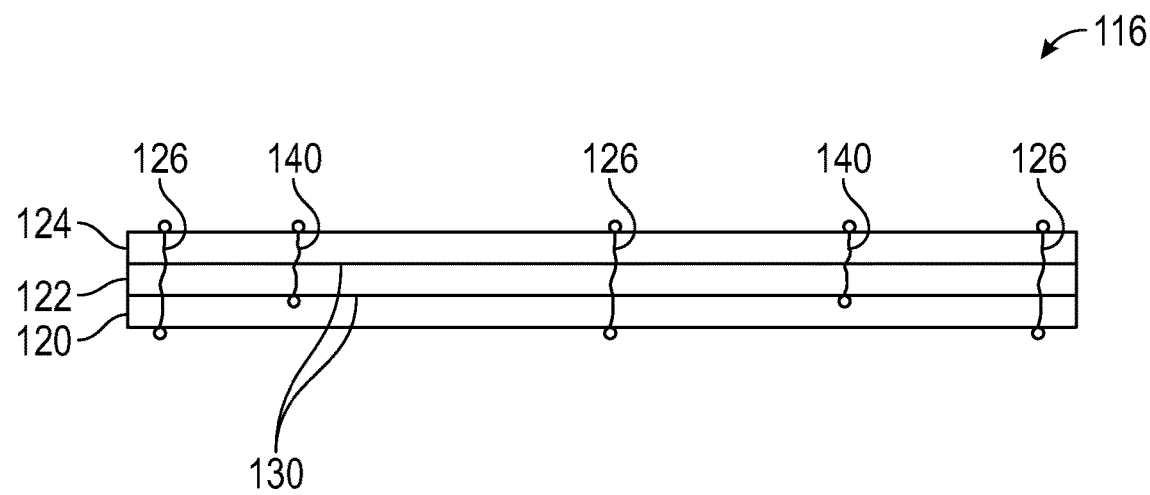
FIG. 2 is a simplified side view illustrating a non-limiting embodiment of a pad assembly of the aircraft floor assembly of FIG. 1.

Referring now to FIG. 2, and with continued reference to FIG. 1, a side view of an embodiment of padding assembly 116 is illustrated. Padding assembly 116 of FIG. 2 is similar to padding assembly 116 of FIG. 1, where like numbers refer to like components. Padding assembly of FIG. 2, however, includes a second plurality of discontinuous couplings 140. Discontinuous couplings 140 are similar to discontinuous couplings 126, but discontinuous couplings 140 secure third pad layer 124 to second pad layer 122 but not to first pad layer 120. In the example provided, discontinuous couplings 140 and discontinuous couplings 126 are the same type of coupling. In some embodiments, discontinuous couplings 140 may be a different type of coupling.

Discontinuous couplings 140 are separately numbered to illustrate that the discontinuous couplings may collectively and cooperatively secure the various pad layers together. For example, there is no need for any coupling to couple to both the first and the third pad layers if some couplings secure the first pad to the second pad and some couplings secure the third pad to the second pad such that the padding assembly may be moved and handled without separation and misalignment of the padding layers. From an installation and removal standpoint, a multiple layer carpet pad should have its layers connected together, forming a single assembly.

Second plurality of discontinuous couplings 140 are laterally staggered such that a line normal to subfloor 112 and passing through any of the discontinuous couplings does not pass through any of the discontinuous couplings of the second group of discontinuous couplings. In other words, discontinuous couplings 140 are not vertically stacked with discontinuous couplings 126.

Figure 3:
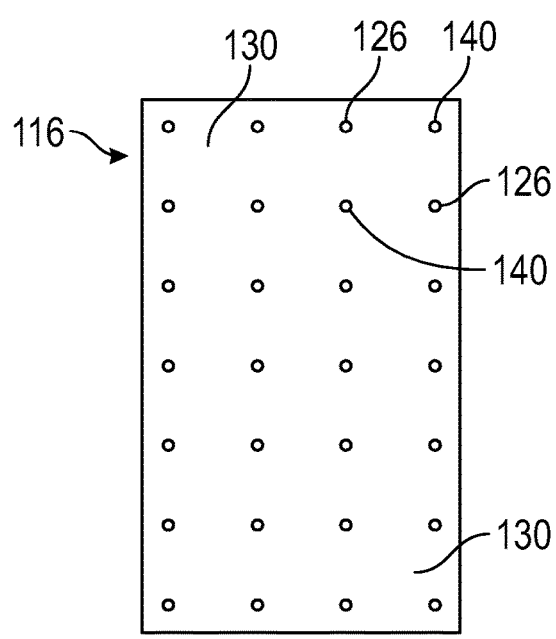
FIGS. 3-6 are simplified top views illustrating non-limiting embodiments of pad assemblies of the aircraft floor assembly of FIG. 1 in accordance with the teachings of the present disclosure.

Referring now to FIG. 3, and with continued reference to FIGS. 1-2, a top view of an embodiment of padding assembly 116 is illustrated. Discontinuous couplings 126 and discontinuous couplings 140 are discrete patches or points. The patches are discrete because there is no coupling material connecting the patches with each other. For example, each of discontinuous couplings 126 may be contained within a patch that is less than an inch in width and length. It should be appreciated that the dimensions of each patch in any given implementation may vary greatly so long as the sum of the area of the patches remains small compared to the floor area. For example, in some embodiments, the patches occupy less than 1% of the floor area. In some embodiments, that patches occupy less than 30% of the floor area.

Figure 4:
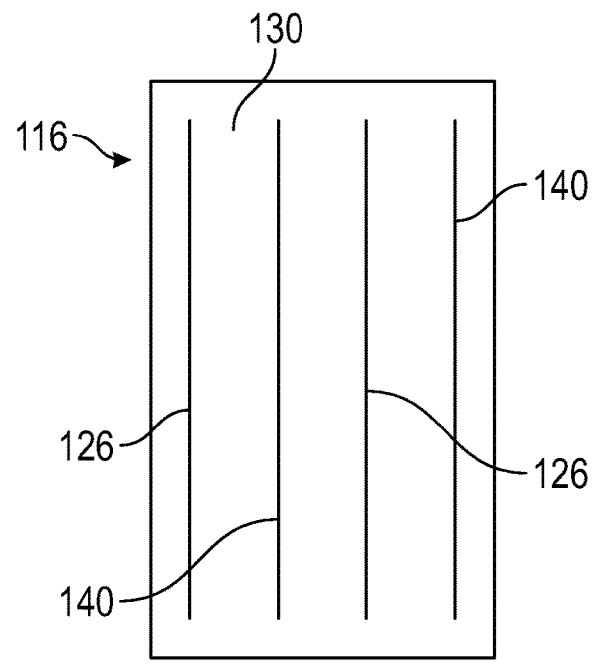

Referring now to FIG. 4, and with continued reference to FIGS. 1-2, a top view of an embodiment of padding assembly 116 is illustrated. Padding assembly 116 is similar to padding assembly 116 of FIG. 3, wherein like numbers refer to like components. Padding assembly 116 of FIG. 4, however, includes discontinuous couplings 126 and 140 that are arranged as discrete lines of attachment. In the example provided, the discrete lines of attachment are parallel to each other. In some embodiments, the discrete lines of attachment are at other angles with respect to each other.

Figure 5:
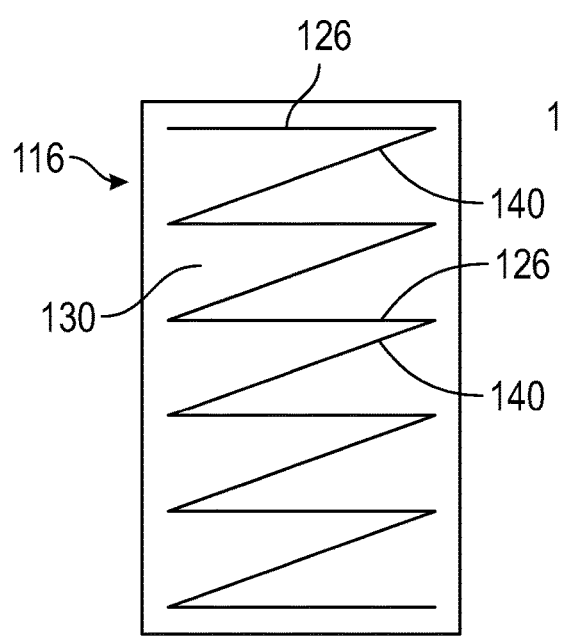

Referring now to FIG. 5, and with continued reference to FIGS. 1-2, a top view of an embodiment of padding assembly 116 is illustrated. Padding assembly 116 is similar to padding assembly 116 of FIG. 3, wherein like numbers refer to like components. Padding assembly 116 of FIG. 5, however, includes discontinuous couplings 126 and 140 that are patterned lines of attachment. The example provided, illustrates a "Z" shaped pattern. In some embodiments, other shaped patterns are implemented.

Figure 6:
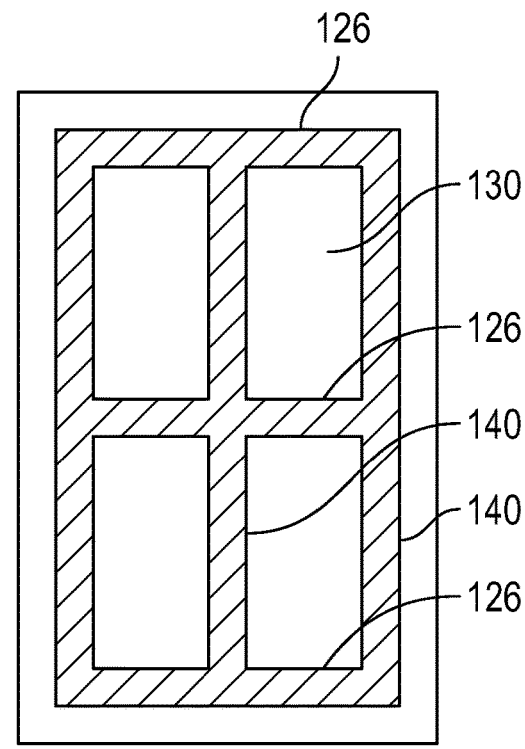

Referring now to FIG. 6, and with continued reference to FIGS. 1-2, a top view of an embodiment of padding assembly 116 is illustrated. Padding assembly 116 is similar to padding assembly 116 of FIG. 3, wherein like numbers refer to like components. Padding assembly 116 of FIG. 6, however, includes discontinuous couplings 126 and 140 that are discrete width patterned lines. Although longitudinal ends of each patterned line may connect with another of the patterned lines, the widths of each line is small enough to that each line does not touch another parallel line. The discrete width patterned lines illustrated form rectangular void portions 130. In some embodiments, the discrete width patterned lines form other shapes of void portions 130.

The embodiments described herein have beneficial sound transmission loss characteristics. In some embodiments, at least one interface layer between two layers of the carpet pad is connected at discrete locations, not continuously over the entire surface area interface. The discrete attachments can consist of stitching, adhesives, needling felt of one material into an adjacent layer, garment tags, or any combination of these or other fastening mechanisms. The mechanical attachment area between two layers at their interface is no more than 30% of the surface area of that interface in some embodiments. The embodiments enhance the sound transmission loss of the aircraft cabin floor assembly (floor panel/carpet pad/carpet), helping to reduce the amount of underfloor and floor radiation noise that enters the cabin of the aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment. It being understood that various changes may be made in the function and arrangement of elements described in an exemplary embodiment without departing from the scope of the invention as set forth in the appended claims.

What is claimed is:

1. A finished floor assembly covering a floor area of an aircraft, the finished floor assembly comprising:
    a subfloor from which noise radiates due to vibrations transmitted by an aircraft structure;
    a padding assembly for attenuating the noise, the padding assembly comprising:
        a first pad layer abutting the subfloor;
        a second pad layer adjacent to the first pad layer; and
        a first plurality of discontinuous couplings laterally separated from each other along the floor area by void portions, the first plurality of discontinuous couplings securing the first pad layer to the second pad layer, wherein the first pad layer and the second pad layer are in contact at the void portions; and
    a finish flooring layer disposed overtop the padding assembly;
    the padding assembly further comprising:
        a third pad layer disposed between the finish flooring layer and the second pad layer; and
        a second plurality of discontinuous couplings separated from each other by a second group of void portions, wherein the second plurality of discontinuous couplings secure the second pad layer to the third pad layer.

2. The finished floor assembly of claim 1, wherein the second plurality of discontinuous couplings are laterally staggered such that a line normal to the subfloor and passing through any of the first plurality of discontinuous couplings does not pass through any of the second plurality of discontinuous couplings.

3. The finished floor assembly of claim 1, wherein the first plurality of discontinuous couplings and the second plurality of discontinuous couplings are discrete patches.

4. The finished floor assembly of claim 1, wherein the first plurality of discontinuous couplings and the second plurality of discontinuous couplings are discrete lines of attachment.

5. The finished floor assembly of claim 1, wherein the first plurality of discontinuous couplings and the second plurality of discontinuous couplings are patterned lines of attachment.

6. The finished floor assembly of claim 1, wherein the first plurality of discontinuous couplings and the second plurality of discontinuous couplings are discrete width patterned lines.

7. The finished floor assembly of claim 1, wherein the finish flooring layer is a carpet layer.

8. The finished floor assembly of claim 7, wherein the first pad layer and the second pad layer are carpet pad layers.

9. The finished floor assembly of claim 8, wherein the first plurality of discontinuous couplings and the second plurality of discontinuous couplings include at least one of stitching, adhesive, needling felt, and garment tags.

10. The finished floor assembly of claim 1, wherein the first plurality of discontinuous couplings and the second plurality of discontinuous couplings are disposed in less than 30% of the floor area.

* * * * *